United States Patent
Hays

(10) Patent No.: US 6,254,671 B1
(45) Date of Patent: Jul. 3, 2001

(54) VERY GREEN-SHADE YELLOW METALLIZED DISAZO PIGMENT

(75) Inventor: Byron G. Hays, Chagrin Falls, OH (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/440,425

(22) Filed: Nov. 15, 1999

(51) Int. Cl.$^7$ .................................................. C09B 45/00
(52) U.S. Cl. .................. 106/496; 8/681; 8/685; 8/687; 430/106; 524/190; 534/581; 534/584; 534/602; 534/816
(58) Field of Search .................. 106/496; 8/681, 8/685, 687; 430/106; 524/190; 534/581, 584, 602, 816

(56) References Cited

U.S. PATENT DOCUMENTS

| | | | |
|---|---|---|---|
| 3,872,078 | * 3/1975 | Cseh et al. | 534/748 |
| 3,978,038 | 8/1976 | Cseh et al. | 534/748 |
| 4,100,157 | * 7/1978 | Muller et al. | 534/575 |
| 4,103,092 | 7/1978 | Jefferies et al. | 534/614 |
| 4,146,558 | 3/1979 | Jefferies et al. | 564/185 |
| 4,269,769 | * 5/1981 | Moiso et al. | 534/745 |
| 5,559,216 | 9/1996 | Jung et al. | 534/579 |
| 5,616,778 | 4/1997 | Goldmann et al. | 560/35 |
| 5,669,967 | 9/1997 | Hays | 106/496 |

FOREIGN PATENT DOCUMENTS

| | | |
|---|---|---|
| 1135688 | 11/1982 | (CA) . |
| 1396526 | 6/1975 | (CH) ............... C09B/33/14 |
| 1400533 | 7/1975 | (CH) . |
| 585247 | 2/1977 | (CH) . |
| 185798B | 10/1978 | (CS) . |
| 188727B | 7/1981 | (CS) . |
| 43 17 773 | 12/1924 | (DE) . |
| 2336915 | 7/1975 | (DE) . |
| 3501199 | 8/1985 | (DE) . |
| 4229207 A1 | 3/1994 | (DE) . |
| 25164 | 3/1981 | (EP) . |
| 12 03865 | 5/1958 | (FR) . |
| 13 84178 | 12/1963 | (FR) . |

OTHER PUBLICATIONS

International Search Report (Nov. 2000).

* cited by examiner

*Primary Examiner*—Anthony Green
(74) *Attorney, Agent, or Firm*—Raymond F. Keller

(57) ABSTRACT

In one embodiment, the present invention relates to a green shade yellow pigment composition comprising a compound having the formula:

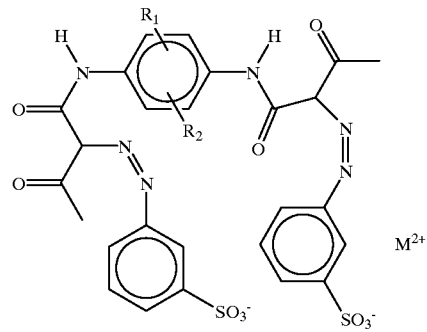

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl; and $M^{2+}$ is a divalent metal. The green shade yellow pigment composition is suitable for use in plastics, paints, inks, electrostatic toners, powder coatings, and paper.

32 Claims, No Drawings

VERY GREEN-SHADE YELLOW METALLIZED DISAZO PIGMENT

TECHNICAL FIELD

This invention generally relates to novel green-shade yellow metallized disazo pigments and to the use of such pigments in plastics, paints, inks, electrostatic toners, powder coatings, and papers.

BACKGROUND OF THE INVENTION

Azo yellow pigments are a class of colorants that are tinctorially strong and relatively inexpensive. Monoazo yellow pigments exhibit good lightfastness and are useful as coloring agents for paints and some printing inks. In plastics, however, monoazo yellow pigments tend to undesirably bloom and discolor at high temperatures, so their use is disfavored. Diarylide disazo yellow pigments, made from 3,3'-dichlorobenzidine, are much stronger tinctorially and show a much lower tendency to bloom and discolor at high temperatures. C.I. Pigment Yellow 17 is a strong green-shade diarylide yellow and has often been used for plastics. W. Herbst and K. Hunger, *Industrial Organic Pigments*, VCH, New York, 1993, p. 252, state: "The plastics industry, however, uses P.Y. 17 extensively, . . . P.Y. 17 is also frequently used in polyolefins . . . . Its heat stability in these media was said to be about 220 to 240° C." However, R. Az et al reported in *Dyes and Pigments*, 15,1 (1991), that diarylide yellows are degraded to potentially carcinogenic by-products (e.g., 3,3'-dichlorobenzidine) in plastics processed above 200° C., a temperature lower than that used in processing most plastics (many plastics are processed at temperatures from 230° C. to 330° C.). In efforts to overcome these disadvantages, azo pigment manufacturers have actively pursued development of other types of azo yellows.

One alternative type of azo yellows include disazo yellow pigments made by coupling bis(acetoacetamido)benzenes (BAAAB) into aniline derivatives. U.S. Pat. No. 5,889,162 to Hays relates to coupling 1,4-BAAAB into 2-ethoxyaniline to obtain strong diazo yellow pigments. U.S. Pat. No. 5,616,778 to Goldmann et al relates to coupling 1,4-BAAAB into 2,5-dicarbomethoxyaniline (to give C.I. Pigment Yellow 155) and heating the pigment in an organic solvent at 80–150° C. for up to 6 hours. U.S. Pat. No. 5,559,216 to Jung et al describes coupling 1,4-bisacetoacetamidobenzene (1,4-BAAAB) into dozens of aniline derivatives. This patent relates to processes for making all these disazo aniline derivative pigments (with a fairly complete list of possible aniline substituents, including $C_1$–$C_4$ alkoxy) in the presence of nonionic surfactants having a 5–90° C. cloud point to give pigments suitable for printing inks.

German Offenlegungsschrift 3501199 (1985, Sandoz GmbH) relates to coupling 1,4-BAMB into mixtures of anilines substituted with one or two carboalkoxy groups to give pigments that disperse easily into polypropylene. Canadian Patent 1135688 (1982, Hoechst AG) relates to the pigments resulting from coupling 1,4-BAAAB into anilines substituted with nitro and carboalkoxy groups. Czech Patents 188727 (1981) and 185798 (1978) relate to the pigments resulting from coupling 1,4-BAAAB into anilines substituted with urea groups. U.S. Pat. Nos. 4,146,558 and 4,103,092 to Jefferies et al relate to coupling 1,4-BAAAB into anilines substituted with quaternized aminoalkyl or aminoalkoxy groups to give water-soluble dyes. Swiss Patent 585247 (1977, Sandoz Ltd.) relates to coupling 1,4BAAAB into an aminoquinoline derivative and heating with N,N-dimethylformamide at 140° C. to obtain a greenish yellow pigment for coloring polyvinylchloride plastics. U.S. Pat. No. 3,978,038 to Cseh et al lists 327 Examples of pigments resulting from coupling 1,4-BAAAB or various substituted 1,4-BAAABs into anilines substituted with nitro groups. U.K. Patents 1400533 and 1396526 (1975, Ciba-Geigy AG) relate to the pigments resulting from coupling 1,4-BAAAB or various substituted 1,4-BAAABs into anilines substituted with a chlorine and methyl groups or two chlorine groups. German Offenlegungsschrift 2336915 (1973, Farbwerke Hoechst AG) relates to the pigments resulting from coupling 1,4-BAAAB or various substituted 1,4-BAAABs into anilines substituted with nitro groups and other groups.

Other alternative types of azo yellows include the metallized monoazo yellows, analogous to the metallized azo red pigments that exhibit high temperature stability in plastics. C.I. Pigment Yellow 62 is a slightly redder yellow, but much weaker tinctorially than C.I. Pigment Yellow 17. Another metallized monoazo yellow, described in U.S. Pat. No. 5,669,967 to Hays, is stronger tinctorially than C.I. Pigment Yellow 17, but is an even redder yellow (though not as red as metallized medium-shade yellows C.I. Pigment Yellows 183 and 191).

Two alternative yellow pigments used by plastics processors include C.I. Pigment Yellow 109 (isoindolinone) and C.I. Pigment Yellow 138 (quinophthalone). These green-shade yellows are very close in hue to C.I. Pigment Yellow 17, but are much more expensive, much weaker and contain eight chlorine atoms per molecule, a potential environmental disadvantage. In this connection, generally speaking, the possibility of degradation into polychlorinated biphenyls (PCBs) and other dangerous compounds exists with aromatic compounds containing chlorine atoms.

Plastics processors using diarylide yellows are particularly conscious of the increased costs of using the higher concentrations of weaker yellows required for coloring plastics to the required tinctorial strengths. Although C.I. Pigment Yellow 155, a disazo pigment made from coupling 1,4-BAAAB, is available, this pigment (Sandorin 4G) is much weaker and slightly redder than C.I. Pigment Yellow 17 and shows poor heat stability (see below) at 288° C., a temperature commonly used to process polypropylene and other plastics.

Pigments that are used in plastics for food and beverage packaging must resist extraction in order to avoid contaminating the packed consumable. Organic substances, such as ethyl alcohol, are common ingredients in food and beverage packaging that causes pigment extraction. Thus, there is a need for new green-shade yellow azo pigments that exhibit good strength, good heat stability and good lightfastness, and present little or no adverse environmental impact, while also exhibiting good resistance to extraction, particularly, alcohol extraction.

SUMMARY OF THE INVENTION

In one embodiment, the present invention relates to a green shade yellow metallized pigment composition comprising a compound having the formula:

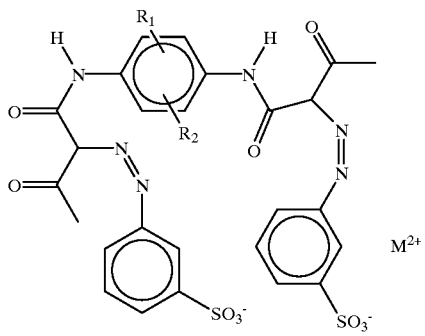

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl; and $M^{2+}$ is a divalent metal.

In another embodiment, the present invention relates to a method of preparing a green shade yellow metallized pigment composition which comprises making a metallized disazo pigment by coupling (i) a diazonium component made from one or more aromatic amines wherein at least one of said amines is metanilic acid (3-amino-benzenesulfonic acid or 3-sulfo-aniline) with (ii) at least one coupling component characterized by the formula:

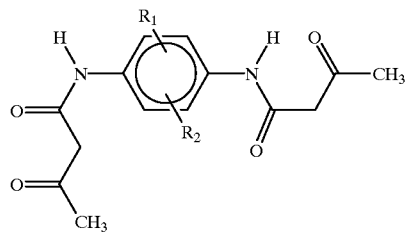

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl; and metallizing with a divalent metal.

In yet another embodiment, the present invention relates to plastics, paints, inks, electrostatic toners, powder coatings, and papers containing metallized disazo pigments according to the invention.

The metallized disazo pigments according to the present invention are very surprising because they possess good tinctorial and chromatic strength, good heat stability and good lightfastness while simultaneously resisting extraction, especially by organic solvents.

DETAILED DESCRIPTION OF THE INVENTION

The present invention relates to very green-shade yellow metallized disazo pigments suitable for use as a coloring agent, methods of making and using the disazo pigment, and plastics, paints and inks containing the metallized disazo pigments. The metallized disazo pigments according to the present invention, made with at least one equivalent of metanilic acid, exhibit unexpectedly high resistance to extraction by organic compounds, while simultaneously exhibiting good tinctorial strengths and heat stability. In many embodiments, the metallized disazo pigments according to the present invention contain little (less than 2 or 1) or no halogen atoms per pigment molecule, so the metallized disazo pigments are environmentally friendly.

Organic compounds to which the metallized disazo pigments according to the present invention resist extraction organic solvents such as ethanol, citric acid, vegetable oils, animal fats, and various compounds used in cleaning supplies.

In one embodiment, the present invention relates to coupling 1,4-bis(acetoacetamido)benzene or substituted 1,4-bis(acetoacetamido)benzene into about two equivalents of metanilic acid (3-sulfoaniline) and metallizing with a divalent metal, such as calcium, to give a metallized disazo yellow pigment having the following chemical structure:

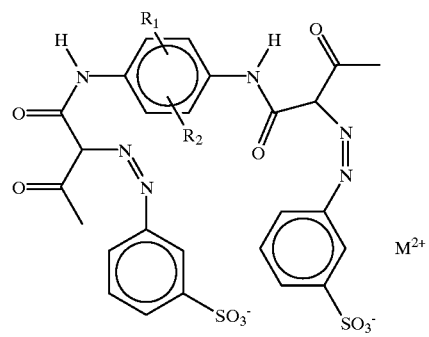

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl; and $M^{2+}$ is a divalent metal. In one embodiment, the metallized disazo pigment is free of halogen atoms, and free of chlorine atoms in particular.

Divalent metals include alkaline earth metals and divalent transition metals. Specific examples of divalent metals include at least one of Mn, Ni, Zn, Mg, Ca, Sr, and Ba. In a preferred embodiment, the divalent metal is at least one of calcium and strontium. In a more preferred embodiment, the divalent metal is calcium.

In a preferred embodiment, the present invention relates to coupling 1,4-bis(acetoacetamido)benzene or substituted 1,4-bis(acetoacetamido)benzene into about two equivalents of metanilic acid and metallizing with calcium to give a metallized disazo yellow pigment having the following chemical structure:

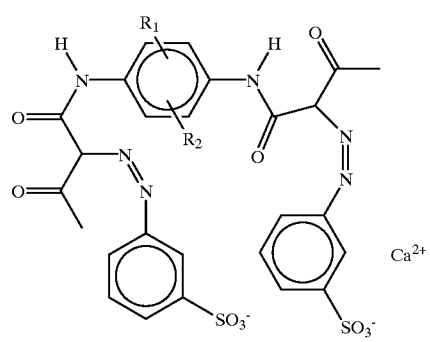

wherein $R_1$ and $R_2$ are independently hydrogen, halogen, an alkyl group having 1 to about 2 carbon atoms, an alkoxy group having 1 to about 2 carbon atoms, or an alkoxycarbonyl group having 1 to about 4 carbon atoms.

In another preferred embodiment, the coupling of 1,4-bis(acetoacetamido)benzene into about two equivalents of metanilic acid and metallizing with a divalent metal provides the disazo yellow pigment having the formula:

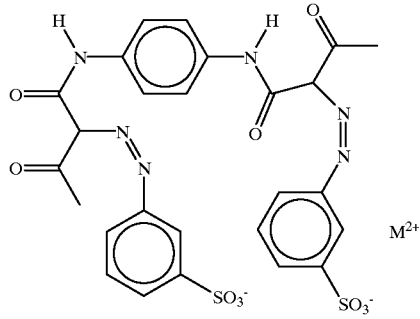

wherein $M^{2+}$ is a divalent metal.

In yet another preferred embodiment, the coupling of 1,4-bis(acetoacetamido)benzene into about two equivalents of metanilic acid and metallizing with calcium provides the disazo yellow pigment having the formula:

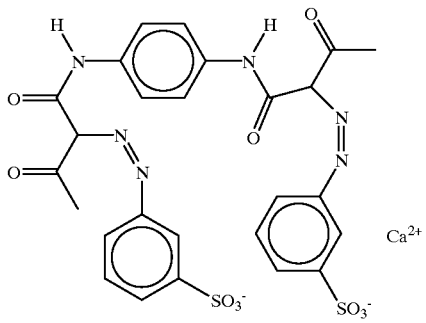

The pigments of the present invention may be prepared by initially diazotizing one or more aromatic amines wherein at least one of said amines is metanilic acid; thereafter coupling the diazonium component with a coupling component comprised of a bis(acetoacetamido)benzene coupler; and metallizing with calcium to form the desired pigment.

At least one of the aromatic amines is free of halogen atoms, such as chlorine atoms, and nitro groups. Mixtures of two or more aromatic amines, such as metanilic acid and an aromatic amine that is not metanilic acid, are within the scope of this invention. Aromatic amines that are not metanilic acid include various aniline compounds, aminobenzoate compounds, aminobenzamide compounds, anilide compounds, aminoanthraquinone compounds, benzimidazole compounds, benzimidazolone compounds, benzimidazolethione compounds, benzoxazole compounds, benzoxazolone compounds, benzothiazole compounds, benzothiazolone compounds, indazole compounds, phthalimide compounds, naphthalimide compounds, benzotriazole compounds, quinoline compounds, quinazoline compounds, quinazolinone compounds, phthalazine compounds, phthalazinone compounds, benzo-oxazinone compounds, dibenzo-phenazine compounds, quinoxalinone compounds, carbazole compounds, indole compounds, aminonaphthalene compounds, and naphthylamino compounds. The aromatic amines from which the diazonium components are prepared are available commercially or can be prepared using methods known in the art.

The diazotization of the amines useful for the purposes of this invention may be carried out in the manners known to those skilled in the art. For example, diazotization may be carried out through the use of alkali metal nitrites or lower alkyl nitrites together with an adequately strong acid such as a mineral acid. Examples of useful mineral acids include hydrochloric acid and sulfuric acid. Nitrosyl sulfuric acid also can be utilized. The diazotization reaction can be conducted at a temperature in the range of from about −20° C. to about 40° C., preferably from about 0° C. to about 20° C.

In one embodiment, it is advantageous in the diazotization reaction mixtures (and in the subsequent coupling reaction mixtures) to include one or more surface active agent such as a non-ionic, an anionic or a cationic surface active agent before, during the reaction or after the reaction is complete. In another embodiment, it is advantageous in the diazotization reactions (and in the subsequent coupling reactions) not to include a surface active agent.

In a preferred embodiment, one or more cationic surface active agents is included in the coupling reaction mixture before or during the reaction. In another preferred embodiment, one or more anionic surface-active agents is included in the coupling reaction mixture after the reaction is completed. In another preferred embodiment, one or more nonionic surface-active agents is included in the coupling reaction mixture before, during, and/or after the reaction is completed.

In one embodiment, the diazotization reaction mixture and/or the coupling reaction mixture contains from about 1 wt. % to about 20 wt. % (based on the weight of the resultant pigment) of a surface active agent (for example, about 4 wt. %), and preferably from about 1 wt. % to about 20 wt. % of a cationic and/or anionic surface active agent. In another embodiment, the diazotization reaction mixture and/or the coupling reaction mixture contains from about 2 wt. % to about 15 wt. % of a surface active agent, and preferably from about 2 wt. % to about 15 wt. % of a cationic and/or anionic surface active agent.

In embodiments where one or more surface active agents are employed, anionic or cationic surfactants are preferred. Examples of surface active agents include amine oxide surfactants, and specifically cationic amine oxide surfactants, sulfosuccinate surfactants and derivatives thereof.

Amine oxide surfactants include N,N-dimethylcocoalkylamine oxide, N,N-dimethylcocoalkylamine, N,N-dimethyl-laurylamine, dimethyl (hydrogenated tallow) amine oxide, dimethylhexadecylamine oxide, bis(2-hydroxyethyl) tallowamine oxide, coco amidopropyl amine oxide, lauryl (12,14,16 blend) dimethyl amine oxide, myristyl dimethyl amine oxide, cocamidopropylamine oxide, and stearyl dimethylamine oxide. Examples include those under the trade designation Aromox® available from Akzo Nobel Chemicals and specifically product designations DMC, DMC-W, DMHT, DM16, and T/12; those under the trade designation Barlox® available from Lonza and specifically product designations C, 12 and 14; those under the trade designation DeMox available from DeForest Enterprises and specifically product designations CAPO and LAO; and those under the trade designation Schercamox available from Scher Chemicals and specifically product designation DMS.

In one embodiment, it is advantageous in the diazotization reactions (and in the subsequent coupling reactions) to include one or more appropriate organic solvents. For example, suitable organic solvents include one or more of glacial acetic acid, lower alkanols, dioxane, formamide, dimethyl formamide, dimethyl sulfoxide, pyridine or N-methyl pyrrolidone. In another embodiment, it is advantageous in the diazotization reactions (and in the subsequent coupling reactions) not to include one or more organic solvents.

Bis(acetoacetamido)benzene couplers include 1,4-bis(acetoacetamido)benzene and substituted 1,4-bis(acetoacetamido)benzenes. The bis(acetoacetamido)benzene couplers suitable for use in the present invention are represented by the formula:

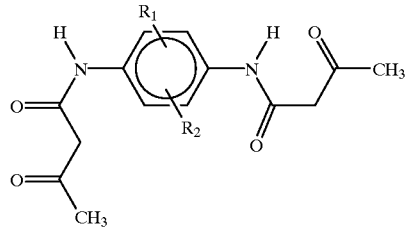

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl. Halogens include fluorine, chlorine, bromine and iodine. These compounds are known or can be synthesized using techniques known in the art.

In a preferred embodiment, the bis(acetoacetamido)benzene couplers suitable for use in the present invention are characterized by the formula:

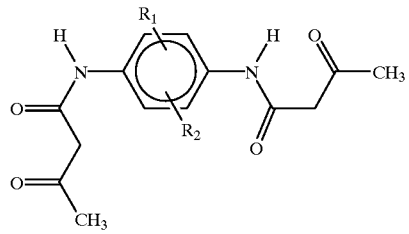

wherein $R_1$ and $R_2$ are independently hydrogen, halogen, an alkyl group having 1 to about 2 carbon atoms, an alkoxy group having 1 to about 2 carbon atoms, or an alkoxycarbonyl group having 1 to about 4 carbon atoms.

Specific examples of bis(acetoacetamido)benzene couplers include 1,4-bis(acetoacetamido)benzene; 2-chloro-1,4-bis(acetoacetamido)benzene; 2-bromo-1,4-bis(acetoacetamido)benzene; 2-trifluoromethyl-1,4-bis(acetoacetamido)benzene; 2,6-bis-trifluoromethyl-1,4-bis(acetoacetamido)benzene; 2-methoxycarbonyl-1,4-bis(acetoacetamido)benzene; 2-ethoxycarbonyl-1,4-bis(acetoacetamido)benzene; 2,5-diethoxycarbonyl-1,4-bis(acetoacetamido)benzene; 2-cyano-1,4-bis(acetoacetamido)benzene; 2-methyl-1,4-bis(acetoacetamido)benzene; 2-methoxy-1,4-bis(acetoacetamido)benzene; 2-ethyl-1,4-bis(acetoacetamido)benzene; 2-ethoxy-1,4-bis(acetoacetamido)benzene; 2-propoxy-1,4-bis(acetoacetamido)benzene; 2-isopropoxy-1,4-bis(acetoacetamido)benzene; 2-butoxy-1,4-bis(acetoacetamido)benzene; 2-phenoxy-1,4-bis(acetoacetamido)benzene; 2-nitro-1,4-bis(acetoacetamido)benzene; 2,5-dimethoxy-1,4-bis(acetoacetamido)benzene; 2,5-diethoxy-1,4-bis(acetoacetamido)benzene; 2-ethoxy-5-methoxy-1,4-bis(acetoacetamido)benzene; 2,5-dichloro-1,4-bis(acetoacetamido)benzene; 2,3-dichloro-1,4-bis(acetoacetamido)benzene; 2,6-dichloro-1,4-bis(acetoacetamido)benzene; 2,5-dibromo-1,4-bis(acetoacetamido)benzene; 2,6-dibromo-1,4-bis(acetoacetamido)benzene; 2-chloro-5-methoxy-1,4-bis(acetoacetamido)benzene; 2-chloro-5-ethoxy-1,4-bis(acetoacetamido)benzene; 2-chloro-5-methyl-1,4-bis(acetoacetamido)benzene; 2,5-dimethyl-1,4-bis(acetoacetamido)benzene; 2-methyl-5-methoxy-1,4-bis(acetoacetamido)benzene; 2-methyl-5-ethoxy-1,4-bis(acetoacetamido)benzene; 2-methyl-5-propoxy-1,4-bis(acetoacetamido)benzene; 2-methyl-5-isopropoxy-1,4-bis(acetoacetamido)benzene; and 2-methyl-5-butoxy-1,4-bis(acetoacetamido)benzene. Mixtures of two or more of any of the bis(acetoacetamido)benzene coupler components are within the scope of this invention.

The coupling reaction useful for the purposes of the present invention may be effected preferably by adding the coupling components to the diazonium components, but the diazonium components can be added to the coupling components. Coupling is generally effected at a temperature of from about −20° C. to about 80° C., preferably from about 0° C. to about 40° C. As in the diazotization reaction, coupling may be carried out in the presence or absence of an suitable surface active agent and/or organic solvent, such as all of those identified above in connection with the diazotization reaction.

In one embodiment, the coupling component is dissolved in a basic solution such as a hydroxide solution including an aqueous alkali metal hydroxide solution.

In another embodiment, generally, the diazonium component is coupled with a slight stoichiometric excess of the coupling component. That is, two equivalents of the diazonium component are coupled with slightly more than two equivalents of the coupling component. In one embodiment, the ratio of equivalents of the diazonium component to the coupling component is from about 1.7:2 to about 2.1:2. In another embodiment, the ratio of equivalents of the diazonium component to the coupling component is from about 1.8:2 to about 2:2 and preferably from about 1.9:2 to about 2:2.

In another embodiment of the present invention, the dispersibility of the pigments of the present invention can be improved by adding alkali-soluble resin-like products before, during, or after the coupling is completed. Various resin-like materials can be added for this purpose, and these include for example, rosin resins, polymeric rosins, resin soap, chemically modified rosin resins, such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions. It may also be advantageous to perform the coupling reaction in the presence of a finely divided insoluble material, for example, alkaline earth metal sulphates and carbonates, titanium dioxide or clay materials or very finely divided organic plastic materials.

The coupled disazo compound is metallized with a suitable amount of a divalent metal so that the compound is fully or substantially metallized (not partially metallized). Metallization is performed using a divalent metal salt which forms the sulfonate salt. This is also known as laking and forms the metallized disazo pigment. The divalent metal salt may be a salt of at least one of alkaline earth metals, manganese, nickel or zinc specifically including mixtures of two or more of these metals. Alkaline earth metal salts are preferred. Examples of divalent metal salts include $CaCl_2$, $CaBr_2$, $CaF_2$, $Ca(NO_3)_2$, $MgCl_2$, $MgBr_2$, $MgF_2$, $Mg(NO_3)_2$, $MgSO_4$, $SrCl_2$, $SrBr_2$, $SrF_2$, $Sr(NO_3)_2$, $BaCl_2$, $BaBr_2$, $BaF_2$, $Ba(NO_3)_2$, $MnCl_2$, $MnBr_2$, $MnF_2$, $Mn(NO_3)_2$, $MnSO_4$, $NiCl_2$, $NiBr_2$, $Ni(NO_3)_2$, $NiSO_4$, $ZnCl_2$, $ZnBr_2$, $ZnF_2$, $Zn(NO_3)_2$, and $ZnSO_4$. Preferred alkaline earth metal salts include $Sr(NO_3)_2$, $SrCl_2$ and $CaCl_2$. Metallization may be accomplished preferably by adding the metal salt to the dye after coupling of all the diazonium components present is complete or, by including the divalent metal salt in the diazonium components whereby metallization occurs as the dye is formed (during coupling).

In most applications, it is desirable, in order to achieve the full brightness and tinctorial strength, to heat the metallized disazo pigment. For example, the metallized disazo pigment may be heated to reflux temperature for about 0.5 to 3 hours or at temperatures above about 85° C. under pressure in the presence or absence of the above-described resin soaps or other soluble resins.

After completion of the reactions and optional heating, the metallized disazo pigments are recovered from the water-based reaction slurry by filtering to form a presscake of pigment which is washed with hot water (e.g., from about 40° C. to about 60° C.) so as to remove the excess acids, bases and salts formed during the coupling reaction. The presscake is typically washed with from about 5 to about 20 times its volume of hot water. The filter cake is generally washed until the filtrate gives only a slightly positive test for chloride ion. The washed presscakes can be dried, ground and used in the form of a coarse or finely divided powder. Alternatively, the metallized disazo pigments of this invention can be dispersed into oleoresinous vehicles to prepare flushed bases or dispersed into aqueous vehicles to prepare aqueous dispersions.

The pigment compositions of this invention provide strong green-shade yellow pigments exhibiting resistance to extraction by organic solvents while having good color strength, light fastness and/or heat stability and are useful as coloring agents in plastics, paints, inks, electrostatic toners, powder coatings, and papers. This invention, therefore, also relates to plastic, paint, ink, electrostatic toner, powder coating, and paper compositions comprising major amounts of a plastic, paint vehicle, ink vehicle, electrostatic toner vehicle, powder coating vehicle, and paper vehicle and minor amounts of the metallized disazo pigment compositions of this invention. In a preferred embodiment, the invention relates to plastics comprising the metallized disazo pigment composition. Major amounts include at least 50% by weight whereas minor amounts include less than 50% by weight.

The paint, ink, plastic, electrostatic toner, powder coating, and paper compositions in which the pigments of this invention are useful are well known to those of ordinary skill in the art. Examples of inks include printing inks and lacquers. The metallized disazo pigment compositions are also useful for pigment printing and for the pigmenting of paper in the mass, electrostatic toners, and powder coatings.

Examples of plastics include thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, and rubber, and also filaments made of viscose and cellulose ethers, cellulose esters, polyamides, polycarbonates, polyurethanes, polyesters, for example polyglycol terephthalates, and polyacrylonitrile. Preferred polyolefins include high density polyethylene, medium density polyethylene, low density polyethylene, very low density polyethylene, and linear low density polyethylene.

Due to its high resistance to extraction by organic solvents, the metallized disazo pigment is particularly suitable for the pigmenting of plastics in the mass, such as, for example, of polystyrene and its mixed polymers, polyolefins, in particular polyethylene and polypropylene and the corresponding mixed polymers and copolymers, polyvinyl chloride and polyesters in particular polyethylene terephthalate and polybutylene terephthalate and the corresponding mixed condensation products based on polyesters, and mixtures and copolymers thereof.

Organic solvents to which the metallized disazo pigment has a high resistance to extraction include alcohols, such as ethanol. In one embodiment, the metallized disazo pigment has a high resistance to alcohol extraction. In a specific embodiment, when a plastic composition containing the metallized disazo pigment and linear low density polyethylene is exposed to a 10% ethanol solution or a 95% ethanol solution at about 65° C. for about 3 days, an extracted yellow color in the solution is not observed. In another specific embodiment, when a plastic composition containing the metallized disazo pigment and linear low density polyethylene is exposed to a 10% ethanol solution or a 95% ethanol solution at about 65° C. for about 4 days, an extracted yellow color in the solution is not observed.

See, for example, with regard to ink: R. H. Leach, editor, *The Printing Ink Manual*, Fourth Edition, Van Nostrand Reinhold (International) Co. Ltd., London (1988), particularly pages 282–591; with regard to paints: C. H. Hare, *Protective Coatings*, Technology Publishing Co., Pittsburgh (1994), particularly pages 63–288; and with regard to plastics: T. G. Webber, *Coloring of Plastics*, John Wiley & Sons, New York (1979), particularly pages 79–204 and B. G. Hays and A. P. Bindra, "Colorants (Overview)," *Concise Polymeric Materials Encylcopedia*, CRC Press, Boca Raton (1998), pages 1321–1332. The foregoing references are hereby incorporated by reference herein for their teachings of ink, paint and plastic compositions, formulations and vehicles in which the compositions of this invention may be used including amounts of colorants.

The following examples illustrate the pigments of the present invention. Unless otherwise indicated in the following examples, in the specification and in the appended claims, all parts and percentages are by weight, temperatures are in degrees centigrade and pressures are at or near atmospheric pressure.

EXAMPLE 1

A diazo solution is prepared with 100 meq metanilic acid (3-aminobenzene-1-sulfonic acid) at 10° C. using hydrochloric acid and sodium nitrite. To the diazo solution is added a solution of 4.2 parts Aromox® DMC (39% by weight active amine oxide surfactant) and 7.2 parts sodium acetate dissolved in water, which raises the pH to 5.3.

A caustic coupler solution is prepared by dissolving 106 meq (14.7 parts) 1,4-bisacetoacetamidobenzene (1,4-BAMB) in warm water (40° C.) containing sodium hydroxide. The coupler solution is pumped into the diazo solution over 18 minutes, at the end of which time the pH is 5.9 and the slurry temperature is 18° C. The pH is raised to about 6.5 with 10% sodium hydrogen carbonate solution, at which point there is no excess diazo. The pH is lowered to 5.3, and the dye is metallized with 200 meq calcium from calcium chloride. The slurry is heated to 100° C. (during which the orange solution converts to a bright greenish-yellow slurry), boiled for 30 minutes, iced to lower than 60° C. and filtered; the filtercake is washed, dried overnight at 820C and pulverized in an Osterizer to give 23.6 parts of a greenish-yellow powder.

EXAMPLE 2

The procedure of Example 1 is repeated, except that after coupling, the pH is 5.7 and the temperature is 21° C.; and, after sodium hydrogen carbonate addition, the pH is 6.4.

EXAMPLE 3

The procedure of Example 2 is repeated, except that the dye is metallized with strontium from strontium nitrate.

EXAMPLE 4

The procedure of Example 1 is repeated, except that the Aromox® DMC is replaced with 4.2 parts of Barlene® 12 (30% by weight active amine oxide surfactant).

EXAMPLE 5

The procedure of Example 1 is repeated, except that the Aromox® DMC is replaced with 1.44 parts of Barlene® 12C (95% by weight active amine surfactant).

EXAMPLE 6

The procedure of Example 1 is repeated, except that the Aromox® DMC is replaced with 5.2 parts of Aerosol® OT-70 (70% by weight active sulfosuccinate surfactant).

COMPARATIVE EXAMPLE 1

The procedure of Example 1 is repeated, except that the diazo solution is prepared with sulfanilic acid (4-amino-benzene-1-sulfonic acid).

COMPARATIVE EXAMPLE 2

The procedure of Example 1 is repeated, except that the diazo solution is prepared with orthanilic acid (2-amino-benzene-1-sulfonic acid).

COMPARATIVE EXAMPLE 3

The procedure of Example 1 is repeated, except that the diazo solution is prepared with Ethyl C Acid (2-amino-5-chloro-4-ethylbenzene-1-sulfonic acid).

COMPARATIVE EXAMPLE 4

The procedure of Example 1 is repeated, except that the diazo solution is prepared with 4-methylmetanilic acid (5-amino-2-methylbenzene-1-sulfonic acid) and the dye is metallized with strontium from strontium nitrate.

COMPARATIVE EXAMPLE 5

The procedure of Example 1 is repeated, except that the diazo solution is prepared with 4B Acid (2-amino-5-methylbenzene-1-sulfonic acid) and the dye is metallized with strontium from strontium nitrate.

COMPARATIVE EXAMPLE 6

The procedure of Example 1 is repeated, except that the diazo solution is prepared with 2B Acid (2-amino-4chloro-5-methylbenzene-1-sulfonic acid) and the dye is metallized with strontium from strontium nitrate.

COMPARATIVE EXAMPLE 7

The procedure of Example 1 is repeated, except that the diazo solution is prepared with C Amine (2-amino-5-chloro-4-methylbenzene-1-sulfonic acid) and the dye is metallized with strontium from strontium nitrate.

COMPARATIVE EXAMPLE 8

The procedure of Example 1 is repeated, except that the diazo solution is prepared with Ethyl C Acid and the dye is metallized with strontium from strontium nitrate.

COMPARATIVE EXAMPLE 9

The procedure of Example 1 is repeated, except that the diazo solution is prepared with 4-methoxymetanilic acid (5-amino-2-methoxybenzene-1-sulfonic acid) and the dye is metallized with strontium from strontium nitrate.

During the testing of pigments, the standard pigment, to which the experimental pigments are compared, is Yellow 2GLTE (C.I. Pigment Yellow 109), an isoindolinone pigment available from Ciba.

Several other commercially available green-shade yellow pigments are included for comparison: a diarylide azo yellow (C.I. Pigment Yellow 14) used in plastics under product designation RX1273 available from Engelhard; an anthranilic acid based yellow (C.I. Pigment Yellow 151) under product designation RX1205 available from Engelhard; Sandorin Yellow 4G (C.I. Pigment Yellow 155), which is a commercial example of this type of disazo pigment made with 1,4-bisacetoacetamidobenzene (1,4-BAMB) available from Sandoz; Permanent Yellow NCG-71 (C.I. Pigment Yellow 16), which is another kind (different) of disazo pigment (made with bisacetoacetylated 3,3'-dimethylbenzidine) available from Hoechst; green-shade diarylide yellow (C.I. Pigment Yellow 17) used in plastics under product designation RX1276 available from Engelhard; Yellow 3G (C.I. Pigment Yellow 93), available from Ciba; and Paliotol Yellow K 0961 HD (C.I. Pigment Yellow 138), a quinophthalone pigment available from BASF.

For comparing tinctorial strength and other coloristic values, the pigments are tested initially as 1:1 (0.1 phr pigment: 0.1 phr titanium dioxide) tints in high density polyethylene injection molded chips, as follows: A mixture of 0.500 part pigment, 0.500 part titanium dioxide and 500 parts high density polyethylene (Solvay T50-2000-G) is shaken on a paint shaker for 15 seconds, then injection molded at 232° C. for 1.5 minutes in a 30 ton Battenfeld machine. Spectrophotometric values of the molded chips are measured with a Macbeth Color-Eye (specular component included, large area) to give K/S apparent strength versus the standard pigment and CIE L*C*h chroma, hue angle and lightness under Illuminant D, 10 degrees, as shown in Table I.

For comparing heat stabilities, the pigments are tested as above for coloristic values of 1:1 tints, except that the chips are molded and held at 550° F. for 3 minutes. Spectrophotometric values of the molded chips are measured with a Macbeth Color-Eye (specular component included, large area) versus the chips molded at 232° C. to give CIELab delta E values, as shown in Table II.

For comparing fade resistance, the high density polyethylene injection molded 1:1 tint chips used for coloristic values are exposed for 100 hours in an Atlas Xenon Fade-Ometer. Spectrophotometric values of the exposed chips are measured with a Macbeth Color-Eye (specular component included, large area) versus unexposed chips to give CIELab delta E values, as shown in Table II.

TABLE I

Coloristic Values of 1:1 Tints in HDPE

| Pigment | Apparent Strength | Hue Angle (h) | Chroma (C*) | Lightness(L*) |
|---|---|---|---|---|
| P.Y. 109 | Standard | 94° | 77 | 89 |
| P.Y. 138 | +32% | 94° | 84 | 89 |
| P.Y. 155 | +41% | 89° | 81 | 85 |
| P.Y. 93 | +47% | 89° | 86 | 87 |
| P.Y. 16 | +64% | 91° | 87 | 88 |
| P.Y. 151 | +24% | 91° | 81 | 89 |
| P.Y. 14 | +134% | 86° | 95 | 86 |
| P.Y. 17 | +63% | 90° | 89 | 88 |
| Ex. 1 | −10% | 96° | 72 | 88 |
| Ex. 2 | −12% | 95° | 71 | 88 |
| Ex. 3 | −17% | 94° | 74 | 90 |
| Ex. 4 | −6% | 95° | 76 | 90 |
| Ex. 5 | −12% | 95° | 74 | 90 |
| Ex. 6 | −16% | 95° | 73 | 90 |
| Cm. Ex. 1 | −7% | 84° | 66 | 81 |
| Cm. Ex. 2 | −43% | 92° | 60 | 86 |
| Cm. Ex. 3 | −48% | 92° | 59 | 87 |
| Cm. Ex. 4 | −51% | 88° | 58 | 87 |
| Cm. Ex. 5 | −50% | 89° | 57 | 86 |
| Cm. Ex. 6 | −77% | 88° | 40 | 88 |
| Cm. Ex. 7 | −57% | 87° | 54 | 87 |
| Cm. Ex. 8 | −64% | 90° | 52 | 89 |
| Cm. Ex. 9 | +9% | 84° | 74 | 84 |

In Table I, the apparent strengths of the Examples (Ex.) are estimated to be 6–17% weaker than P.Y. 109 in 1:1 tints. The hue angles of the Example tints are generally slightly higher (slightly greener) than the P.Y. 109 tint. The apparent strengths of several Comparative Examples (Cm. Ex.), not made with metanilic acid, are generally markedly weaker than P.Y. 109 and the Examples. The Comparative Examples that are stronger also have a much redder (lower hue angle) than P.Y. 109. Generally speaking, the apparent strengths, hue angles, chromas, and lighffastness of the Examples are comparable to P.Y. 109.

TABLE II

Change (Delta E) in Coloristic Values of 1:1 Tints in HDPE After:

| Pigment | Heat Stability Testing | Fade Resistance Testing |
|---|---|---|
| P.Y. 109 | 0.4 | 0.45 |
| P.Y. 138 | 3.6 | 1.06 |
| P.Y. 155 | 19.5 | 1.5 |
| P.Y. 93 | 2.5 | 0.46 |
| P.Y. 16 | 7 | 0.75 |
| P.Y. 151 | 5.2 | 1.4 |
| P.Y. 14 | 6.4 | 0.6 |
| P.Y. 17 | 1.5 | 1.4 |
| Ex. 1 | 1.6 | 1.7 |
| Ex. 2 | 0.7 | 1.5 |
| Ex. 3 | 2.4 | 7.6 |
| Cm. Ex. 1 | 0.3 | 4.1 |
| Cm. Ex. 2 | 3.4 | — |
| Cm. Ex. 3 | 3.3 | — |

In Table II, the delta Es (a measure of change) for the heat stabilities of the first two Examples are comparable to those of P.Y. 109. The first two Examples have superior heat stabilities compared to most, but not all, of the conventional pigments. Also in Table II, the delta Es for the fade resistances of the Examples are generally comparable to those of the conventional pigments.

When incorporated in polyolefins, the pigments obtained according to the present invention display excellent resistance to solvent extraction and bright greenish shade yellows in contrast to the generally redder shade yellows displayed by conventional pigments.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A green shade yellow pigment composition comprising a compound having the formula:

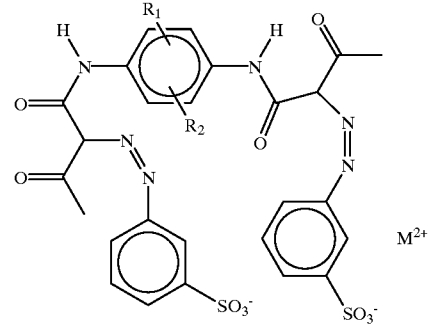

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl; and $M^{2+}$ is a divalent metal.

2. A composition according to claim 1, wherein at least one of $R_1$ and $R_2$ is an alkyl group containing from 1 to about 2 carbon atoms.

3. A composition according to claim 1, wherein $R_1$ and $R_2$ are hydrogen.

4. A composition according to claim 1, wherein at least one of $R_1$ and $R_2$ is a halogen.

5. A composition according to claim 4, wherein the divalent metal is at least one selected from the group consisting of Mn, Ni, Zn, Mg, Ca, Sr, and Ba.

6. A composition according to claim 1 further comprising from about 1 wt % to about 20 wt % of a cationic amine oxide surfactant.

7. A composition according to claim 3 further comprising from about 1 wt % to about 20 wt % of a cationic amine oxide surfactant.

8. A green shade yellow pigment composition comprising one or more compounds having the formula:

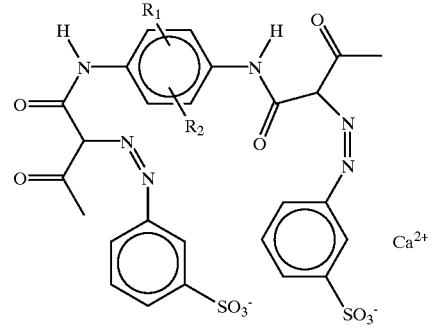

wherein $R_1$ and $R_2$ are independently hydrogen, halogen, an alkyl group having 1 to about 2 carbon atoms, an alkoxy group having 1 to about 2 carbon atoms, or an alkoxycarbonyl group having 1 to about 4 carbon atoms.

9. A composition according to claim 8, wherein at least one of $R_1$ and $R_2$ is hydrogen.

10. A composition according to claim 8 further comprising from about 1 wt % to about 20 wt % of at least one surfactant selected from the group consisting of N,N-dimethylcocoalkylamine oxide, N,N-dimethylcocoalkylamine, and N,N-dimethyl-laurylamine.

11. A composition according to claim 8 further comprising from about 1 wt % to about 20 wt % of a cationic amine oxide surfactant.

12. A method of preparing a green shade yellow pigment composition which comprises making a metallized disazo pigment by coupling (i) a diazonium component made from of one or more aromatic amines wherein at least one of said amines is metanilic acid with (ii) at least one coupling component characterized by the formula:

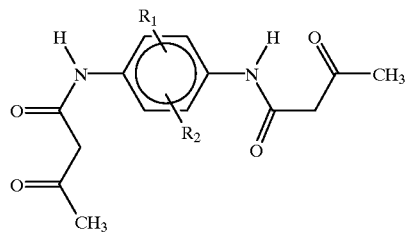

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl; and metallizing with a divalent metal.

13. A method according to claim 12 wherein (i) and (ii) are coupled in the presence of at least one surfactant selected from the group consisting of N,N-dimethylcocoalkylamine oxide, N,N-dimethylcocoalkylamine, and N,N-dimethyl-laurylamine.

14. A method according to claim 12 further comprising adding from about 1 wt % to about 20 wt % of a cationic amine oxide surfactant.

15. A method according to claim 12 wherein the ratio of equivalents of (i) to (ii) is from about 1.7:2 to about 2.1:2.

16. A method according to claim 12 wherein $R_1$ and $R_2$ are hydrogen.

17. A method according to claim 12 wherein the divalent metal is at least one selected from the group consisting of Mn, Ni, Zn, Mg, Ca, Sr, and Ba.

18. A method according to claim 12 wherein the divalent metal is calcium.

19. A composition prepared according to the method of claim 12.

20. A composition prepared according to the process of claim 16.

21. A paint composition comprising a major amount of a paint vehicle and a minor amount of the composition of claim 1.

22. A paint composition comprising a major amount of a paint vehicle and a minor amount of the composition of claim 17.

23. An ink composition comprising a major amount of an ink vehicle and a minor amount of the composition of claim 1.

24. An ink composition comprising a major amount of an ink vehicle and a minor amount of the composition of claim 17.

25. A plastic composition comprising a major amount of a plastic material and a minor amount of the composition of claim 1.

26. A plastic composition comprising a major amount of a plastic material and a minor amount of the composition of claim 17.

27. A plastic composition comprising a major amount of a plastic material and a minor amount of green shade yellow pigment composition comprising a compound having the formula:

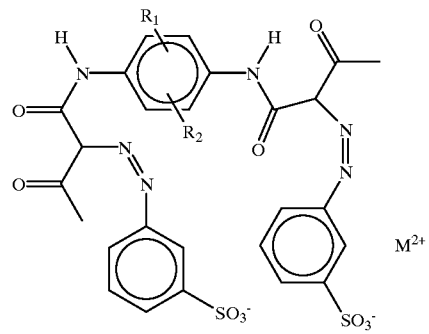

wherein $R_1$ and $R_2$ are independently hydrogen, halogen, an alkyl group having 1 to about 4 carbon atoms, an alkoxy group having 1 to about 4 carbon atoms, an alkoxycarbonyl group having 1 to about 6 carbon atoms, nitro, cyano, phenoxy or trifluoromethyl; and $M^{2+}$ is a divalent metal.

28. A plastic composition according to claim 27, wherein the plastic material comprises at least one selected from the group consisting of a thermoplastic material and a thermosetting material.

29. A plastic composition according to claim 27, wherein the plastic material comprises at least one selected from the group consisting of a polystyrene, a polyolefin, a polyacrylic compound, a polyvinyl compound, a polyester, a rubber, a cellulose ether, a cellulose ester, a polyamide, a polycarbonate, a polyurethane, a polyacrylonitrile.

30. A plastic composition according to claim 27, wherein the plastic material comprises at least one selected from the group consisting of high density polyethylene, medium density polyethylene, low density polyethylene, very low density polyethylene, and linear low density polyethylene.

31. A powder coating composition comprising a major amount of a powder coating vehicle and a minor amount of the composition of claim 1.

32. An electrostatic toner composition comprising a major amount of an electrostatic toner vehicle and a minor amount of the composition of claim 1.

* * * * *